July 22, 1969      J. C. NORCROSS      3,456,330
METHOD OF MAKING AND ASSEMBLING A DEAD-BLOW HAMMERHEAD
Original Filed Dec. 20, 1965
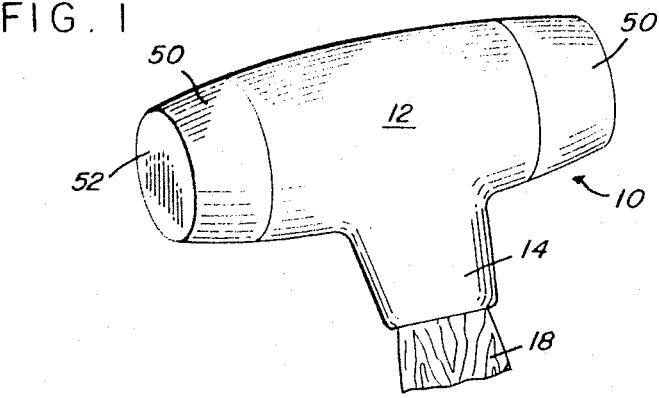
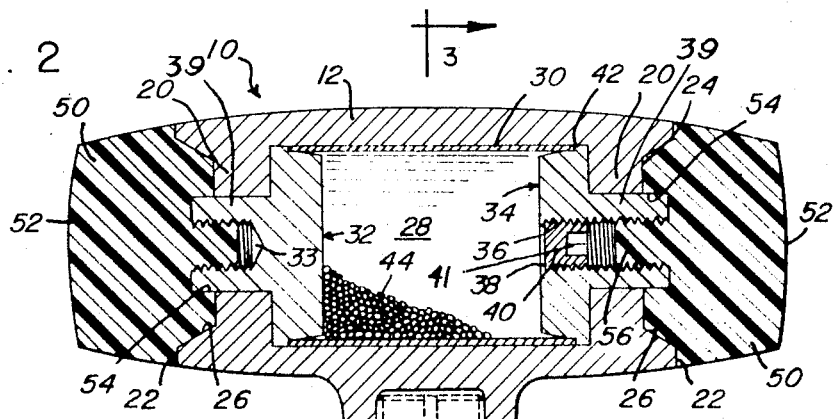
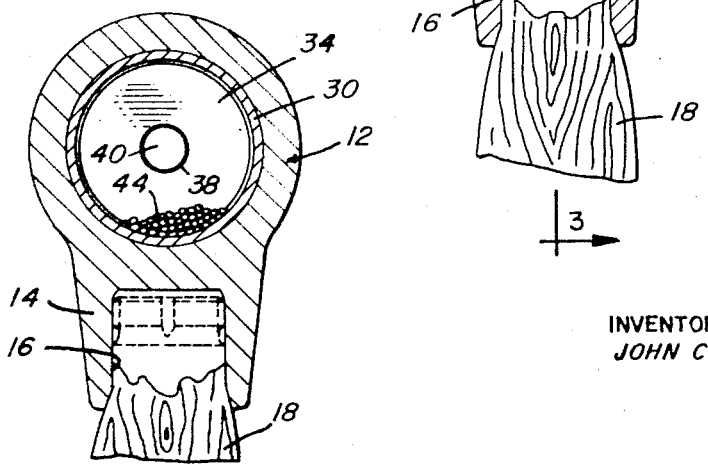
INVENTOR:
JOHN C. NORCROSS United States Patent Office 3,456,330
Patented July 22, 1969

3,456,330
METHOD OF MAKING AND ASSEMBLING A
DEAD-BLOW HAMMERHEAD
John C. Norcross, Bushnell, Ill., assignor to Vaughan
& Bushnell Mfg. Co., Chicago, Ill., a corporation of
Illinois
Original application Dec. 20, 1965, Ser. No. 524,668, now
Patent No. 3,343,576, dated Sept. 26, 1967. Divided
and this application Feb. 16, 1967, Ser. No. 616,513
Int. Cl. B23p 19/02, 21/00
U.S. Cl. 29—469                                    2 Claims

ABSTRACT OF THE DISCLOSURE

A method of making and assembling a dead-blow hammer wherein a cylindrical body is die cast around a tubular shell containing a quantity of flowable impact material in such a manner as to leave exposed threaded sockets in the end faces of the body. Impact tips are then screwed into the sockets to complete the hammer.

---

This application is a division of copending patent application Ser. 524, 668, filed by me on Dec. 20, 1965, now Patent No. 3,343,576 and entitled when filed "Dead-Blow Hammer Head and Method of Making the Same."

The present invention relates generally to impact tools and has particular reference to a novel method of making and assembling a particular dead-blow hammerhead, that is, the dead-blow hammerhead of said patent application Ser. No. 524,668. Dead-blow hammerheads of the type to which the present invention pertains are primarily intended for industrial use and they are usually of the mallet type in that they are provided with dual striking end tips which are replaceable after they have become worn. A dead-blow hammerhead of this type is characterized by the provision therein of an internal chamber within which there is disposed a mass of flowable inertia material (usually lead or steel shot) which is capable of shifting within the chamber so that when a blow is struck by either striking end tip, the inertia material will shift in the direction of the blow so as to assume a position adjacent to the particular end tip which, at that time, is effective, and thus prevent recoil of the hammerhead.

A standard or conventional dead-blow hammerhead of the type briefly outlined above is possessed of certain limitations, principal among which is the high cost of manufacturing the head, the design of the head being such that assembly operations are of an involved nature and, therefore, costly. Moreover, prior to such assembly operations, careful machining of hammerhead parts is required in order to secure a proper fit, and after the assembly of parts has been effected further machining and polishing are required if the head is to present a smooth and finished exterior such as is necessary for effective saleability of the completed hammerhead.

The present invention has for its principal object the provision of a simple and novel method of making and assembling a dead-blow hammerhead, such method being characterized by the fact that it lends itself to facility of dead-blow hammerhead manufacture and the consequent elimination of the aforementioned limitations.

Other objects of the invention and the various advantages and characteristics thereof not at this time enumerated will readily suggest themselves as the nature of the invention is better understood from a consideration of the following detailed description.

In the accompanying single sheet of drawings forming a part of this specification, there is illustrated a dead-blow hammerhead which is made and assembled in accordance with the method constituting the present invention.

In these drawings:

FIG. 1 is a perspective view of a dead-blow hammerhead which is made and assembled according to the present invention;

FIG. 2 is an enlarged sectional view taken centrally and longitudinally through the hammerhead of FIG. 1; and FIG. 3 is a vertical traverse sectional view taken on the line 3—3 of FIG. 1.

Referring now to the drawings in detail, the dead-blow hammerhead which is made and assembled in accordance with the particular method constituting the present invention is designated in its entirety by the reference numeral 10 and it involves in its general organization a body portion 12 which is formed of a suitable light-weight metal such, for example, as aluminum or zinc and is susceptible to a die-casting operation. The body portion 12 is generally of tubular cylindrical configuration and, on the central part of one side thereof, it is provided with a radially and outwardly projecting cylindrical boss 14. The latter affords a relatively deep socket 16 which is designed for reception therein of one end of a conventional wooden, fiberglass, plastic or other handle 18.

Internal annular flanges 20 at small distances inwards of the end surfaces of the tubular body portion 12 partially close the otherwise open ends of said body portion. Said end surfaces of the body portion constitute shoulder-forming annular rims 22 which surround shallow recesses 24 having outwardly flared or frusto-conical side walls 26. The flanges 20 establish between them and within the central part of the body portion 12 an internal chamber 28.

Positioned within the chamber 28 and in intimate contact with the cylindrical side wall of the latter is a thin-walled steel tube 30 which may be cut from tube stock and the open ends of which are spaced slight distances inwards from the flanges 20. One end of this tube 30 is closed by a blind or solid end cap 32 having at its outer end portion a threaded socket 33, and the other end is closed by an end cap 34 having formed therein a centrally disposed, full-length, threaded bore 36. The latter is provided at its inner end with a shoulder 38. Each end cap is formed with an outwardly projecting stem portion 39 which extends through and beyond the central opening in the adjacent or associated annular flange 20. The threaded socket 33 of the end cap 32 is formed in the outwardly projecting stem portion of said end cap 32; and the bore 36 in the end cap 34 extends longitudinally or axially through the outwardly projecting stem 39 of said end cap 34. The inner end of the bore 36 in the end cap 34 is closed by a removable, externally-threaded plug 40. The latter has in its outer end portion a polygonal socket 41 for reception of an Allen wrench and seats against the shoulder 38 as shown in FIG. 2. The end caps fit telescopically within the open ends of the tube 30 with a tight press fit and are provided with a rim flanges 42 which seat upon the open rims of said tube. A quantity of a flowable inertia material such as lead or steel shot 44 is loosely disposed within the interior of the tube 30 in order to give the head 10 the desired dead-blow characteristics.

To complete the hammerhead 10, removable percussion end tips 50 are provided, these end tips being of identical construction and preferably formed of a suitable plastic material and the hardness of which may be varied according to the particular use to which the hammerhead is to be put. Each end tip is generally of cylindrical design. It is conformable in diameter to the diameter of the tubular body portion 12 and embodies on its outer end portion a generally circular striking or impact surface 52. The inner end portion of each end tip is of reduced diameter. In addition, it is inwardly tapered in order that it is conformable in shape to that of the adjacent or associated recesses 24. Each end tip 50 is formed with an annular recess 54 to accommodate the projecting end or rim of the adjacent stem portion 39. Externally-threaded studs 56 are formed integrally with the inner end portions of the end caps and project centrally and inwards from the annular recesses 54. One stud is threadedly received in the socket 33 in the end cap 32 and the other stud is threadedly received in the outer end portion of the bore 36 in the end cap 34. As a result of this, the inner reduced end portions of the end tips 50 may be proper turning be drawn tightly into the shallow recesses 24.

In actual manipulative use for striking purposes, the dead-blow hammer 10 of the present invention does not differ from the use of a standard or conventional dead-blow hammer. However, for consumer use and purposes of hammer care, conditioning and end tip replacement, the removable plug 40 is provided for the purpose of affording access to the interior of the chamber 28 for the addition of small quantities of the aforementioned inertia material into the chamber or removal of such quantities therefrom for weight adjustment purposes as required by the consumer or user, it being understood that the adjacent end tip 50 will first be removed in order to afford access to the externally-threaded plug 40.

The above-described hammerhead 10 lends itself to manufacturing and assembly operations according to the method of the present invention and by means of which manufacturing costs are greatly reduced and hammer appearance is enhanced without final polishing operations. Accordingly, in constructing and assembling the hammerhead 10, the steel tube 30 is cut to length from tube stock while the two end caps 32 and 34 are machined from bar stock on an automatic screw machine or the like. The blind end cap 32 is first inserted in one open end of the tube 30 by a press fitting operation. Thereafter, the tube is upended so as to provide an upwardly facing cup structure having a large upper open rim through which a measured quantity of the lead or steel shot 44 or other loose inertia material may conveniently be poured or otherwise introduced. The other end cap 34 is then press-fitted within the upper open rim of the tube 30 and the threaded plug 40 is installed within the inner end of the bore 36 so that it bottoms or seats against the annular shoulder 38, thus enclosing and capturing the shot 44 within the interior of the tube 30. The thus formed or constructed sub-assembly of parts, minus the two end tips 50, is then placed in the cavity of a die casting machine and the body portion 12 is then cast in position around the subassembly. After removal from the die cavity, the end tips 50 are installed on the end faces of the die cast structure by screwing the shanks 56 thereof into the socket 33 and the bore 36 respectively, thus completing the assembly of the hammerhead 10. The step which involves assembly of the handle 18 on the head 10 constitutes no part of the present method of this operation may be performed by either the manufacturer or the consumer. Preferably, the handle is applied to the hammerhead 10 by bonding of the adjacent end thereof within the socket 16 with a suitable epoxy resin, one practical method of installation being shown and described in my co-pending patent application Ser. No. 509,811, filed on Nov. 26, 1965, and entitled "Percussion Head and Handle Joint and Method of Making and Assembling the Same."

By reason of the fact that the body portion 12 of the hammerhead 10 is die cast about the aforementioned sub-assembly which includes the tube 30, the end caps 32 and 34, the plug 40, and the inertia material 44, and by reason of the fact that close tolerances are maintained as regards the diameters of the body portion 12 and the end tips 50, no final machining or polishing operations are required in order to afford or produce the required smooth continuous outer surface of the hammerhead as a whole. The wide open rim of the tube 30 as it exists before installation of the end cap 34 affords a large filling area for the interior of the tube 30 and eliminates the necessity of employing a funnel or other guide structure for introduction of the shot 44, as is the case where the central chamber must be filled through a small hole in one of the end caps. The plug 40 seals the interior of the tube 30 against escape of the shot 44 when the adjacent end tip 50 is removed for replacement or other purposes. This plug may, however, and as previously described, be removed by the ultimate user of the hammerhead for the purpose of introducing additional quantities of shot 44 to the interior of the tube 30 or of removal of shot therefrom, depending, of course, on the contemplated use of the hammerhead 10.

It is to be noted that because the body portion 12 of the hammerhead 10 is die cast about the sub-assembly including the tube 30 and the end caps 32 and 34, the inwardly directed internal flanges 20 serve to prevent longitudinal shifting of the tube 30 within the chamber 28. In the absence of the flanges 20, in the event that either end tip 50 is not firmly screwed in position against the adjacent end face of the body portion, a blow struck by such end tip would otherwise cause longitudinal shifting of the tube within the chamber 28.

The invention is not to be limited to the particular method that is described in this specification for the reason that the various steps thereof are, if desired, capable of variation without departing from the spirit or scope of the invention. Therefore, only insofar as the invention is particularly pointed out in the accompanying claims is the same to be limited.

Having thus described the invention what I claim as new and desire to secure by Letters Patent is:

1. The method of constructing and assembling a dead-blow hammerhead which comprises: cutting from tube stock a length of tubing to provide an open-ended tube, machining from bar stock a pair of end caps having threaded sockets in their outer end portions, press-fitting one end cap into one end of the tube, upending the tube to provide a cup-shaped structure having its open rim presented upwardly, introducing a quantity of flowable bulk inertia material into the cup-shaped structure through said open rim of the structure, press-fitting the other end cap into the other end of the tube, placing the sub-assembly in the form of the tube, end caps and inertia material within the cavity of a die casting machine, die casting a cylindrical body portion about such sub-assembly in coaxial relation with respect to the tube and in intimate contact with the tube and with the outer peripheral portions of the end caps, leaving the threaded sockets of the end caps exposed, providing indentical impact end tips having projecting threaded studs thereon and also having in the vicinity of the studs end faces which mate with the end faces of the die cast body portion, and finally threading said studs into the sockets of the end caps to bring said end faces of the end tips and body portion into mating engagement.

2. The method of making and assembling a dead-blow hammerhead which comprises: cutting from tube stock a length of tubing to provide an open-ended tube, machining from bar stock a first blind end cap having a threaded socket therein and a second end cap having a threaded bore therethrough, press-fitting the blind end cap into one end of the tube, upending the tube to provide a cup-shaped structure having its open rim presented upwardly, introducing a quantity of flowable bulk inertia material into the cup-shaped structure through said open rim of the structure, press-fitting the second end cap into the other end of the tube, closing the threaded bore in the second end cap by threading a short plug into said bore so as to leave, in effect, an open threaded socket outwardly of the plug, placing the sub-assembly in the form of the tube, end caps, inertia material and plug within the cavity of a die casting machine, die casting a cylindrical body portion about such sub-assembly in coaxial relation with respect to the tube and in intimate contact with the tube and with the outer peripheral portions of the end caps, leaving the threaded sockets of the end caps exposed, providing identical impact end tips having projecting threaded studs thereon and also having in the vicinity of the studs end faces which mate with the end faces of the die cast body portion, and finally, threading said studs into the sockets of the end caps to bring said end faces of the end tips and body portion into mating engagement.

References Cited

UNITED STATES PATENTS

| | | | |
|---|---|---|---|
| 1,234,878 | 7/1917 | Corvin | 29—529 |
| 2,604,914 | 7/1952 | Kahlen | 145—36 |
| 2,890,318 | 6/1959 | Kruse | 164—98 X |
| 3,088,506 | 5/1963 | Bianchini | 145—36 |
| 3,130,762 | 4/1964 | Kerr | 145—36 X |

CHARLIE T. MOON, Primary Examiner

U.S. Cl. X.R.

29—525, 527; 164—98